(12) United States Patent
Yelike et al.

(10) Patent No.: US 12,351,326 B2
(45) Date of Patent: Jul. 8, 2025

(54) POWER GENERATION SYSTEM COMPRISING A FUEL CELL

(71) Applicant: Hamilton Sundstrand Corporation, Charlotte, NC (US)

(72) Inventors: Sai Kalyan Yelike, Cork (IE); Paolo Grasso, Cork (IE); Grzegorz Kruczek, Gliwice (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/630,419

(22) Filed: Apr. 9, 2024

(65) Prior Publication Data

US 2024/0343400 A1 Oct. 17, 2024

(30) Foreign Application Priority Data

Apr. 12, 2023 (EP) .................................... 23461555

(51) Int. Cl.
| | | |
|---|---|---|
| B64D 27/33 | (2024.01) | |
| B64D 27/355 | (2024.01) | |
| B64D 33/10 | (2006.01) | |
| B64D 13/08 | (2006.01) | |

(52) U.S. Cl.
CPC ........... B64D 27/33 (2024.01); B64D 27/355 (2024.01); B64D 33/10 (2013.01); *B64D 13/08* (2013.01)

(58) Field of Classification Search
CPC .... F02C 7/224; F02C 3/04; F02C 6/08; F02C 6/18; B64D 2013/0688; B64D 2013/0625; B64D 2013/0603; B64D 27/33; B64D 27/335
See application file for complete search history.

(56) References Cited

U.S. PATENT DOCUMENTS

| | | | |
|---|---|---|---|
| 6,834,831 B2 * | 12/2004 | Daggett ............ | H01M 8/04089 429/495 |
| 7,380,749 B2 | 6/2008 | Fucke et al. | |
| 8,623,566 B2 | 1/2014 | Westenberger et al. | |
| 9,840,413 B2 * | 12/2017 | Hotto ................... | B01J 19/2475 |
| 11,731,780 B2 * | 8/2023 | Ranjan .................. | B64D 41/00 454/71 |
| 2006/0237583 A1 * | 10/2006 | Fucke .................... | B64D 13/06 244/58 |
| 2020/0391876 A1 | 12/2020 | Morrison | |
| 2022/0255094 A1 * | 8/2022 | Vallur Rajendran ....................... | H01M 8/04604 |
| 2022/0356848 A1 * | 11/2022 | Joshi ................. | H01M 8/04761 |
| 2022/0364513 A1 | 11/2022 | Muldoon et al. | |
| 2023/0069975 A1 | 3/2023 | Quartarone et al. | |

(Continued)

OTHER PUBLICATIONS

European Search Report for Application No. 23461555.7, mailed Oct. 6, 2023, 10 pages.

*Primary Examiner* — Thuyhang N Nguyen
(74) *Attorney, Agent, or Firm* — CANTOR COLBURN LLP

(57) ABSTRACT

A power generation system for an aircraft includes: a storage tank for storing hydrogen; a fuel cell configured to generate power from the hydrogen; a fuel supply line configured to supply the hydrogen from storage tank to the fuel cell; a fresh air supply line configured to supply air to a cabin air supply system; and a fuel-air heat exchange system, wherein the fuel supply line and the air supply line pass through the fuel-air heat exchange system such that the hydrogen cools the air in use.

11 Claims, 1 Drawing Sheet

(56) References Cited

U.S. PATENT DOCUMENTS

2023/0080053 A1 3/2023 Emerson et al.
2023/0365263 A1* 11/2023 Wang .................... B64D 13/08

* cited by examiner

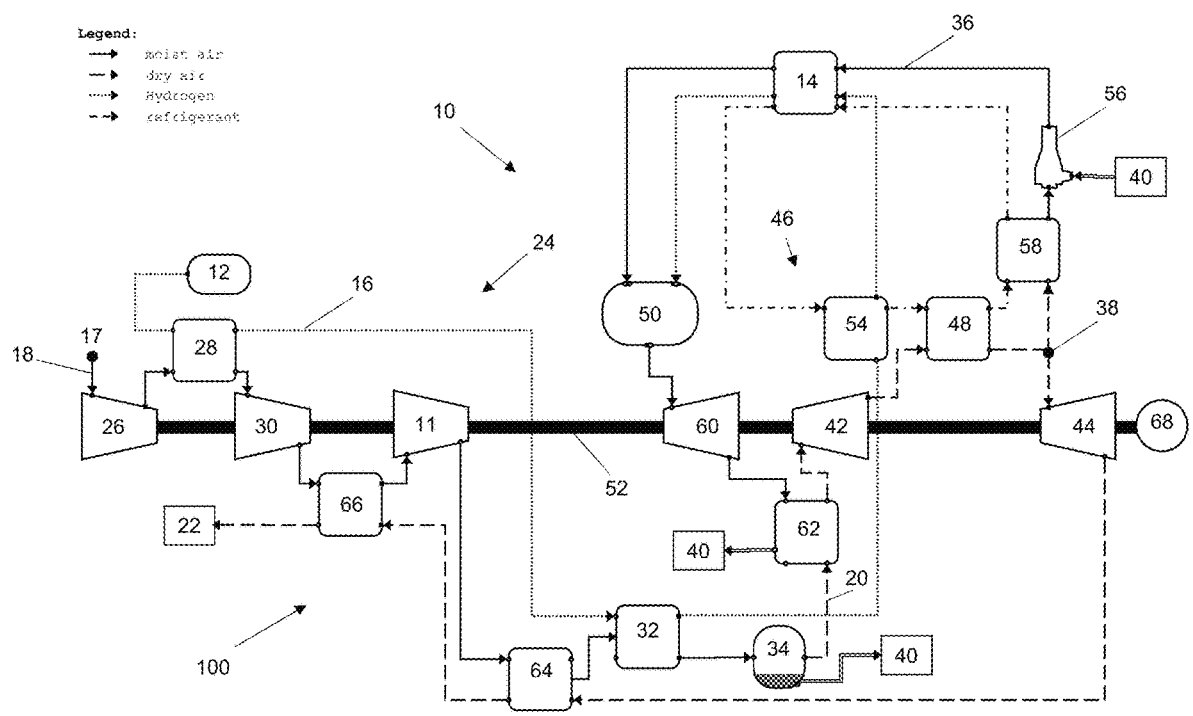

POWER GENERATION SYSTEM COMPRISING A FUEL CELL

CROSS REFERENCE TO RELATED APPLICATIONS

This application claims priority to European Patent Application No. 23461555.7 filed Apr. 12, 2023, the entire contents of which is incorporated herein by reference.

FIELD

This application relates to a power generation system for an aircraft, an aircraft and a method.

BACKGROUND

In order to reduce aircraft emissions hydrogen fuel cells are used increasingly to generate energy for aircraft electrical power consuming devices. Hydrogen fuel cells require a supply of conditioned hydrogen. It is desirable to reduce the energy consumed in producing the hydrogen and storing it on the aircraft.

SUMMARY

In a first aspect, there is provided a power generation system for an aircraft, the power generation system comprising: a storage tank for storing hydrogen; a fuel cell configured to generate power from the hydrogen; a fuel supply line configured to supply the hydrogen from storage tank to the fuel cell; a fresh air supply line configured to supply air to a cabin air supply system; and a fuel-air heat exchange system, wherein the fuel supply line and the air supply line pass through the fuel-air heat exchange system such that the hydrogen cools the air in use.

Hydrogen is stored as a subcooled liquid to reduce the space it occupies on the aircraft. However, the hydrogen must be heated before it reaches the fuel cell. Air in a fresh air supply line may need to be cooled before it can be supplied to an aircraft's cabin. As such, total energy consumption may be reduced by transferring heat from the air to the hydrogen.

The power generation system may comprise a compressor, wherein the fresh air supply line passes through the compressor such that the compressor compresses the air in use, wherein the fuel-air heat exchange system comprises a post-compressor heat exchanger downstream of the compressor to transfer heat from the air to the hydrogen.

The power generation system may comprise a downstream compressor, wherein the fresh air supply line passes through the downstream compressor such that the downstream compressor compresses the air in use, wherein the downstream compressor is downstream of the post-compressor heat exchanger.

The power generation system may comprise an upstream compressor, wherein the fresh air supply line passes through the upstream compressor such that the upstream compressor compresses the air in use, wherein the upstream compressor is upstream of the compressor.

The fuel-air heat exchange system comprises a separator heat exchanger to pass heat from the air to the hydrogen, the process system comprising a separator downstream of or combined with the separator heat exchanger, wherein the separator is configured to separate water from the air.

The power generation system may comprise a fuel cell air supply configured to supply air to the fuel cell, wherein the fuel cell air supply is configured to receive air from a splitter in the fresh air supply line.

The power generation system may comprise a water recirculation line, the water recirculation line configured to recirculate water from the separator to the fuel cell air supply.

The power generation system may comprise an air turbine, wherein the fresh air supply line passes through the air turbine such that air turbine generates power from the air in use.

The air turbine may be a first turbine downstream of the separator.

The air turbine may be a second turbine downstream of the splitter.

The power generation system may comprise a refrigeration system, the refrigeration system comprising a refrigerant configured to cool the fuel cell.

The power generation system may comprise a refrigerant-air heat exchanger, wherein the fresh air supply line passes through the refrigerant-air heat exchanger such that the refrigerant heats the air in use.

The refrigerant-air heat exchanger may be upstream of the air turbine.

The power generation system may comprise an upstream air turbine, wherein the fresh air supply line passes through the upstream air turbine such that the upstream air turbine generates power from the air in use.

The upstream air turbine may be downstream of the separator.

The upstream air turbine may be upstream of the refrigerant-air heat exchanger.

The power generation system may comprise a combustor, the combustor configured to receive excess hydrogen from the fuel cell and combust the excess hydrogen to recover energy.

The compressors and/or turbines may be mechanically coupled or share a common shaft.

According to a second aspect, there is provided an aircraft comprising the power generation system as described above or otherwise herein.

According to a third aspect, there is provided a method of operating an aircraft, the method comprising: supplying hydrogen from a storage tank to a fuel cell via a fuel supply line; supply air to a cabin air supply system via a fresh air supply line; and passing heat from the air in the fresh air supply line to the hydrogen in the fuel supply line.

The aircraft of the second aspect may comprise any of the features described with respect to the first aspect. The method of the third aspect may include any functional steps described in relation to the first and/or second aspects.

BRIEF DESCRIPTION OF THE DRAWINGS

Various examples will now be described with reference to the accompanying drawings in which:

The FIGURE shows a process flow diagram of a process system for an aircraft.

DETAILED DESCRIPTION

With reference to the FIGURE an aircraft 100 comprises a power generation system 10.

The power generation system 10 comprises a storage tank 12, a fuel cell 14, a fuel supply line 16, a fuel cell air supply 36, a refrigeration system 46, and an ejector 56.

The storage tank 12 is for storing fuel, which in this example is liquid hydrogen. The fuel cell 14 is for chemically converting the fuel into electrical energy for providing to the aircraft 100. The fuel supply line 16 receives the liquid hydrogen and supplies the hydrogen, once conditioned, to the fuel cell 14.

The refrigeration system 46 comprises a refrigerant-fuel heat exchanger 54, a refrigerant-air heat exchanger 48, a second refrigerant-air heat exchanger 58 and a refrigerant.

The power generation system 10 further comprises a water recirculation line 40, a combustor 50, a common shaft 52, a splitter 38, a generator or motor 68 and a plurality of compressors 11, 26, 30, additional heat exchangers 62, 64, 66 and turbines 42, 44, 60.

The power generation system 10 further comprises a fresh air supply line 18, 20, a fuel-air heat exchange system 24, a separator 34 and a cabin air supply system 22.

The fresh air supply line 18, 20 comprises a moist air line 18 and a dry air line 20.

The aircraft 100 provides the power generation system 10 with an input airflow 17 (e.g. from engine bleed air or ram air). The fresh air supply line 18, 20 receives the input airflow 17 from the aircraft 100 and supplies air, once conditioned, to the cabin air supply system 22.

The fuel-air heat exchange system 24 comprises a post-compressor heat exchanger 28 and a separator heat exchanger 32.

It is a first objective of the power generation system 10 to provide energy to the aircraft 100. The energy may be electrical energy, or mechanical energy, or both.

It is a second objective of the power generation system 10 to condition the input airflow 17 to provide conditioned air to the cabin air supply system 22. This may occur whilst the aircraft is in flight at an altitude of, for example, 10,000 meters (32,808 feet), or whilst the aircraft is not in flight and is at ground or sea level.

Parts of the power generation system 10 can thus be for providing air to the cabin air supply system 22, or for providing energy to the aircraft via the hydrogen fuel cell 14. To improve the efficiency of the power generation system 10, the power generation system 10 overlaps or combines a number of parts such that the first and second objectives can be met simultaneously by the same parts.

In general, it is to be understood that the terms "first" and "second" as used herein are not to denote any particular order. The terms "first" and "second" are used merely as identifiers for different components or stages.

It is to be understood that additional components may be required to fully implement this disclosure, for example any component generally in the field of Electronic, Control and Instrumentation (E, C&I), or other chemical or processing apparatus, may be required. In particular, this includes a pump for example for the refrigerant, recirculation fans, mixing manifolds for example for mixing fresh air and part of the recycled consumed air from the cabin, and water injectors for example to saturate the air inlet of the Fuel Cell (FC).

Because the input airflow 17 is extracted from the aircraft's external local environment, the condition of the input airflow varies significantly. For example, the temperature of the airflow could vary between −50° C. to +40° C. and the moisture or humidity level could vary between 1% to 70%.

In this exemplary scenario, the aircraft 100 is in flight at an altitude of 10,000 meters. The input airflow is at −50° C., 26,000 Pa (approximately 25% of atmospheric pressure at sea level). In order to meet regulatory safety requirements, it is required that the air supplied to the cabin air supply system 22 be at 85,000 Pa, and 24° C.

The input airflow 17 is received by the compressor 26 which provides a first compression stage to the airflow. As a result, the temperature and pressure of the airflow increases.

The compressed airflow output from the compressor 26 is provided to a first channel of the post-compressor heat exchanger 28 via the moist air supply line 18.

At the same time, liquid hydrogen stored in the storage tank 12 is extracted for use in the fuel cell 14. In the present example the liquid hydrogen is stored at below −250° C., and at a pressure of 8 MPa. The liquid hydrogen is extracted and supplied to a second channel of the post-compressor heat exchanger 28 via the fuel supply line 16.

The post-compressor heat exchanger 28 allows the compressed airflow provided by the compressor 26 to transfer heat energy to the liquid hydrogen extracted from the storage tank 12. In this manner, the compressed airflow is cooled and the hydrogen is heated.

As hydrogen is stored as a subcooled liquid to reduce the space it occupies on the aircraft, the hydrogen must be heated before it reaches the fuel cell. Air in a fresh air supply line may need to be cooled before it can be supplied to an aircraft's cabin, in particular due to the air being compressed to increases its pressure. As such, total energy consumption may be reduced by transferring heat from the air to the hydrogen.

The airflow is then transferred via the moist air supply line 18 to the downstream compressor 30 which provides a second compression stage to the airflow. As a result, the temperature and pressure of the airflow increases. The airflow is then transferred to additional heat exchanger 66 and then to a third compressor 11. The additional heat exchanger 66 is described in more detail below. The third compressor 11 provides a third compressions stage which increases the temperature and pressure of the airflow.

After the third compressor 11, the airflow is transferred via the moist air supply line 18 to a first channel of the separator heat exchanger 32. At the same time, the hydrogen output from the post-compressor heat exchanger 28 is transferred via the fuel supply line 16 to a second channel of the separator heat exchanger 32.

The separator heat exchanger 32 allows the compressed airflow to transfer heat energy to the hydrogen in the same manner as the post-compressor heat exchanger 28. As a result, the compressed airflow is further cooled and the hydrogen is further heated. The processing of the moist air supply line 18 is described further below.

The fuel supply line 16 transfers the hydrogen from the second channel output from the separator heat exchanger 32 to a first channel of the refrigerant-fuel heat exchanger 54. The refrigerant of the refrigeration system 46 flows through a second channel of the refrigerant-fuel heat exchanger 54, as described further below.

The refrigerant-fuel heat exchanger 54 allows the refrigerant to transfer heat energy to the hydrogen. As a result, the refrigerant is cooled and the hydrogen is further heated.

The hydrogen, which has now passed through three heat exchangers, is in a conditioned state ready to be supplied to the fuel cell 14. The hydrogen is supplied to the fuel cell 14 via the fuel supply line 16.

Returning to the separator heat exchanger 32, the moist air supply line 18 transfers the airflow from the first channel output from the separator heat exchanger 32 to the separator 34. The separator 34 separates water and air in the airflow. The separator outputs dehydrated (dry) air to the dry air supply line 20, and the water to the water recirculation line 40. The water recirculation line 40 is described further below.

The dry air supply line 20 transfers the dry airflow to a first turbine 42, which is an air turbine. Providing the dry airflow to the first turbine 42 causes the first turbine 42 to rotate, which provides the dry airflow with a first decompression stage. This causes the temperature and pressure of the dry airflow to decrease.

The dry airflow is then transferred via the dry air supply line 20 to a first channel in the refrigerant-air heat exchanger 48. The refrigerant of the refrigeration system 46 flows through a second channel of the refrigerant-fuel heat exchanger 54, as described further below. The refrigerant-air heat exchanger 48 allows the refrigerant to transfer heat energy to the dry airflow. As a result, the refrigerant is cooled and the dry airflow is heated.

The dry airflow is then transferred via the dry air supply line 20 to the splitter 38. The splitter 38 splits the dry airflow. A portion of the dry airflow is directed towards the cabin air supply system 22. A portion of the dry airflow is directed towards the fuel cell 14.

The portion of the dry airflow which is directed towards the fuel cell 14 is transferred to the ejector 56. The ejector 56 receives water from the water recirculation system 40 and combines the water with the dry airflow, to output the fuel cell air supply 36. The fuel cell air supply 36 is thus conditioned to have an appropriate level of moisture as required by the fuel cell 14.

Because the water for the fuel cell air supply 36 is provided by the separator 34, a more efficient fuel cell 14 operation can be achieved, which utilises airflow from different parts of the power generation system 10, and water from the separator 34.

The fuel cell 14 thus receives the conditioned hydrogen output from the refrigerant-fuel heat exchanger 54, and the fuel cell air supply 36 output from the ejector 56. The fuel cell 14 chemically converts the hydrogen and air into water and air, and generates electricity in the process. Some hydrogen is not consumed by the fuel cell 14, and as a result the fuel cell outputs waste hydrogen, water and air.

Fuel cells offer reliable power generation for high power requirements. With no moving parts, the construction of a fuel cell is simple and output power supply can be varied to fluctuating power demand. Integrating the fuel cell with an onboard micro or nano-grid network through appropriate power converts (DC-AC) may be beneficial. Varying the power output can be achieved by controlling the flow of inbound reactants (hydrogen and air). This offers significant advantages with simplicity and zero-emissions.

As discussed above, the refrigeration system 46 comprises a refrigerant. The refrigerant may be any suitable coolant medium, for example Ethylene-Glycol, capable of providing efficient heat transfer.

During operation of the fuel cell 14, waste thermal/heat energy is generated by the fuel cell which needs to be safely dissipated or managed. If the waste heat generated by the fuel cell is not removed from the fuel cell 14, the fuel cell 14 may overheat and malfunction. Because one of the input reactants to the fuel cell 14 is hydrogen which is highly combustible, this poses a particular risk and challenge. It is therefore important to safely dissipate the waste heat from the fuel cell 14, as well as dispose of the waste hydrogen and air output from the fuel cell.

To safely dissipate the waste heat from the fuel cell 14, the refrigeration system 46 transfers heat energy from the fuel cell 14, via the refrigerant, to the refrigerant-fuel heat exchanger 54, and then to the refrigerant-air heat exchanger 48, and then to the second refrigerant-fuel heat exchanger 58. As discussed above, in each heat exchanger 48, 54, 58, the refrigerant transfers heat energy to the other fluid in the heat exchanger. In this manner, the refrigeration system 46 cools the fuel cell 14 by transferring the heat energy from the fuel cell 14 to either the airflow in the dry air supply line 20, or to the hydrogen in the fuel supply line 16.

Thus, the output from the second channel of the second refrigerant-fuel heat exchanger 58 is connected to the fuel cell 14, for providing the fuel cell 14 with a relatively cool refrigerant.

The waste hydrogen and air and are provided to the combustor 50. The combustor 50 combusts the waste hydrogen using the air as an oxidant in the combustion process. The combustion process causes the combustor 50 to output an exhaust fluid at a relatively high temperature and pressure compared to the input waste hydrogen and air. The exhaust fluid is transferred to a third turbine 60, which causes the third turbine 60 to rotate.

The third turbine 60 can be connected to a generator 68. As such, the rotational force in the third turbine 60 causes the generator 68 to generate electrical energy which can be used in the aircraft 100. Alternatively or additionally, the rotational force in the third turbine 60 can be used to rotate the common shaft 52. The common shaft 52 can be directly connected or mechanically coupled, for example through a gearbox, to the compressors 11, 26, 30 in the process system 10. As a result, the rotational force from the third turbine 60 causes the common shaft 52 to rotate, which in turn rotates (and thus operates) the compressors 11, 26, 30. The generation of electrical energy or the rotation of the compressors 11, 26, 30 is useful work.

The waste hydrogen from the fuel cell 14 is thus combusted to produce useful work. As a result of combusting the waste hydrogen, the risk of handling or storing waste hydrogen is reduced and the aircraft safety is improved. Furthermore, because the waste hydrogen is repurposed to produce useful work, the overall efficiency of the aircraft 100 can be improved.

The third turbine 60 provides a decompression stage to the exhaust fluid, which reduces the temperature and pressure of the exhaust fluid. The exhaust fluid is then provided to the additional heat exchanger 62. The dry airflow output from the separator 34 is also provided to the additional heat exchanger 62, prior to entering the first turbine 42. The additional heat exchanger 62 exchanges heat between the relatively hotter fluid and cooler dry airflow. The dry airflow is then output to the first turbine 42 as discussed above. The additional heat exchanger 62 also provides water for the water recirculation system 40.

Returning to the dry air supply line 20, the portion of the dry airflow which is directed to the cabin air supply system 22 is transferred to a second turbine 44, which is an air turbine. Providing the dry airflow to the second turbine 44 causes the second turbine 44 to rotate, which provides the dry airflow with a second decompression stage. This causes the temperature and pressure of the dry airflow to further decrease.

The dry airflow is then directed to the cabin air supply system 22 through additional heat exchangers 64, 66. The additional heat exchangers 64, 66 exchange heat between the moist air supply line 18 and the dry air supply line 20. As a result, the dry air supply line is further conditioned as required for the cabin air supply system 22, and at the same time the moist air supply line 18 is further conditioned to be received by the separator 34.

The turbines 42, 44, 60 are mechanically coupled, for example through a gearbox, or directly connected to the compressors 11, 26, 30 via the common shaft 52. As such, when the turbines rotate, the compressors are also caused to rotate.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A power generation system for an aircraft, the power generation system comprising:
   a storage tank for storing hydrogen;
   a fuel cell configured to generate power from the hydrogen;
   a fuel supply line configured to supply the hydrogen from storage tank to the fuel cell;
   a fresh air supply line configured to supply air to a cabin air supply system;
   an air turbine, wherein the fresh air supply line passes through the air turbine such that air turbine generates power from the air in use;
   a fuel-air heat exchange system;
   wherein the fuel supply line and the air supply line pass through the fuel-air heat exchange system such that the hydrogen cools the air in use;
   wherein the fuel-air heat exchange system comprises:
   a separator heat exchanger to pass heat from the air to the hydrogen; and
   a separator downstream of or combined with the separator heat exchanger wherein the separator is configured to separate water from the air;
   the power generation system further comprising:
   a fuel cell air supply configured to supply air to the fuel cell, wherein the fuel cell air supply is configured to receive air from a splitter in the fresh air supply line;
   wherein the air turbine is a first turbine downstream of the separator.

2. A power generation system according to claim 1, further comprising:
   a compressor, wherein the fresh air supply line passes through the compressor such that the compressor compresses the air in use;
   wherein the fuel-air heat exchange system comprises a post-compressor heat exchanger located downstream of the compressor to transfer heat from the air to the hydrogen.

3. A power generation system according to claim 2, further comprising:
   a downstream compressor, wherein the fresh air supply line passes through the downstream compressor such that the downstream compressor compresses the air in use;
   wherein the downstream compressor is downstream of the post-compressor heat exchanger.

4. A power generation system according to claim 1, wherein the fuel-air heat exchange system comprises:
   a separator heat exchanger to pass heat from the air to the hydrogen; and
   a separator downstream of or combined with the separator heat exchanger, wherein the separator is configured to separate water from the air.

5. A power generation system according to claim 4, further comprising:
   a fuel cell air supply configured to supply air to the fuel cell, wherein the fuel cell air supply is configured to receive air from a splitter in the fresh air supply line.

6. A power generation system according to claim 5, further comprising:
   a water recirculation line, the water recirculation line configured to recirculate water from the separator to the fuel cell air supply.

7. A power generation system according to claim 1, wherein the air turbine is a second turbine downstream of the splitter.

8. A power generation system according to claim 1, wherein the compressors or turbines are mechanically coupled to or share a common shaft.

9. A power generation system according to claim 1, further comprising:
   a combustor, the combustor configured to receive excess hydrogen from the fuel cell and combust the excess hydrogen to recover energy.

10. An aircraft comprising:
    a power generation system according to claim 1.

11. A power generation system for an aircraft, the power generation system comprising:
    a storage tank for storing hydrogen;
    a fuel cell configured to generate power from the hydrogen;
    a fuel supply line configured to supply the hydrogen from storage tank to the fuel cell;
    a fresh air supply line configured to supply air to a cabin air supply system; and
    a fuel-air heat exchange system;
    wherein the fuel supply line and the air supply line pass through the fuel-air heat exchange system such that the hydrogen cools the air in use;
    a refrigeration system, the refrigeration system comprising a refrigerant configured to cool the fuel cell; and
    a refrigerant-air heat exchanger, wherein the fresh air supply line passes through the refrigerant-air heat exchanger such that the refrigerant heats the air in use.

* * * * *